ated Patent [19]

Eing A. et al.

[11] Patent Number: 4,516,205
[45] Date of Patent: May 7, 1985

[54] ACCESS CONTROL OF DATA TRANSMISSION NETWORK

[76] Inventors: Hubert I. Eing A., J. B. Pastene 3111, Santiago 10, Chile; Rolf D. Klein, Strassberger Str. 34, 8000 Munchen 40, Fed. Rep. of Germany

[21] Appl. No.: 440,373

[22] Filed: Nov. 9, 1982

[51] Int. Cl.³ ............................................. G06F 15/16
[52] U.S. Cl. ...................................... 364/200; 370/85
[58] Field of Search ................. 364/200, 900; 370/85, 370/101, 110, 96

[56] References Cited

U.S. PATENT DOCUMENTS

| | | | |
|---|---|---|---|
| 4,059,851 | 11/1977 | Nutter | 364/200 |
| 4,149,144 | 4/1979 | Dicfenderfer | 370/85 |
| 4,156,112 | 5/1979 | Moreland | 370/85 |
| 4,223,380 | 9/1980 | Antonaccio | 364/200 |
| 4,223,381 | 9/1980 | Rozell | 364/200 |
| 4,347,604 | 8/1982 | Saito | 370/85 |
| 4,387,425 | 6/1983 | El-Gohart | 364/200 |
| 4,390,944 | 6/1983 | Quackenbush | 364/200 |
| 4,402,040 | 8/1983 | Euch | 364/200 |
| 4,405,979 | 9/1983 | Holtey | 364/200 |
| 4,430,700 | 2/1984 | Chadima | 364/200 |

Primary Examiner—Charles E. Atkinson
Assistant Examiner—Michael R. Fleming
Attorney, Agent, or Firm—Beveridge, DeGrandi & Weilacher

[57] ABSTRACT

A system for controlling access to a data transmission network of a bus configuration. After a communication unit has completed transmission of a message block, the communication unit transmits a synchronization signal over the bus. Each of the communication units of the network which has a message block for transmission responds to that synchronization signal by applying to the data bus the logical ones of the address of the associated data station, or of a virtual address resulting from an algorithm performed on that station address, the logical ones being applied in sequence during respective bit intervals. During bit intervals of the logical zeros of the station address, or of the virtual address, the communication unit monitors the bus. If during such monitoring the communication unit detects a logical one on the data bus, the communication unit terminates transmission of its logical ones and awaits the next synchronization signal. Thus, the communication unit of the highest station address, or virtual address, obtains control of the bus and only one communication unit transmits a message block at any one time, assuring there is no interference or collision of message blocks. On initialization of the system, if a communication unit monitors the data bus for a preset time without receipt of any transmission, the communication unit first transmits a logical one to the data bus and then transmits the logical ones of its station address to gain control of the bus, by the procedure mentioned above.

9 Claims, 6 Drawing Figures

ACCESS CONTROL OF DATA TRANSMISSION NETWORK

BACKGROUND OF THE INVENTION

The present invention pertains to a data transmission system. More particularly, the present invention pertains to a data transmission network allowing communication between a plurality of data stations with each data station being permitted access within a reasonable time interval to the data network for transmission of data, while avoiding interference which would result from simultaneous data transmission from more than one station.

Data transmission networks consist of a number of data stations interconnected for data exchange. Such data stations might include computer systems, small scale computers, and various peripheral equipment such as intelligent or non-intelligent terminals. Each data station is coupled to the network by a communication unit. The data network can be any communication medium including, by way of examples, twisted pair wire, coaxial cable, or fibre optical cable. The stations of the network might be connected in a star, a ring, or a bus configuration, among others. A bus structure is usually preferred because it is easier to install and to cable.

In a data bus, however, control of the various data stations is desirable to avoid data transmission by more than one station at any one time, since such simultaneous transmission would result in interference or collision of the various data signals. Different techniques are utilized to avoid such interference, including frequency division multiplexing and time division multiplexing. Time division multiplexing is often preferred because of its comparative cost advantages. Time division multiplexing can be achieved by a central control system or by a distributed control system. In a distributed control system, a central control system can be imitated by defining temporarily one of the communication units as the master unit with temporary control of the network. Alternatively, each communication unit can have equal status and can utilize the network whenever it has data for transmission and finds the network communication bus unoccupied. However, it is desirable that the time for obtaining network control be comparatively small with respect to the time for data transfer.

SUMMARY OF THE INVENTION

The present invention is a control system for data transmission networks of a bus configuration which permits each communication unit in turn access to the network when that communication unit finds the network available, making that communication unit the temporary master unit, while requiring minimal time for the unit to seize control of the network. In accordance with the present invention, each data station is assigned a unique address, and after each data transmission on the network, those communication units having data for transmission compare their data station addresses bit by bit to determine the communication unit then having highest priority. That communication unit is then given access to the network. The priority can be determined from the data station addresses themselves, or as a result of an algorithm, which for example might include the addresses of the data stations and the address of that data station which has just completed transmission.

These and other aspects and advantages of the present invention are more apparent from the following detailed description and claims, particularly when considered in conjunction with the accompanying drawings in which like components are designated by like reference numerals. In the drawings:

DETAILED DESCRIPTION OF PRESENTLY PREFERRED EMBODIMENTS

Figure 1:
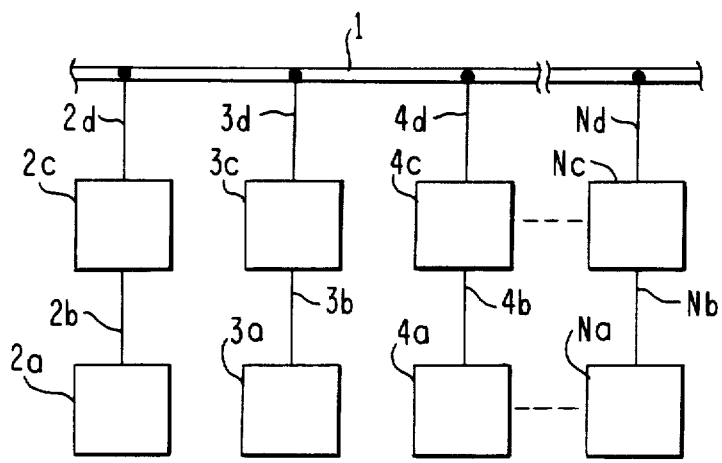
FIG. 1 is a block diagram of a local data transmission network including an access control system in accordance with the present invention.

FIG. 1 depicts a data transmission network including a data bus 1 to which a plurality of data stations are coupled by means of uniquely associated communication units. Thus, data station 2a is connected by line 2b to communication unit 2c which in turn is connected by line 2d to data bus 1. In like manner, each of the other data stations 3a, 4a, ... Na is connected by a line 3b, 4b ... Nb to a communication unit 3c, 4c, ... Nc which is connected by a line 3d, 4d, ... Nd to communication bus 1. Thus any data station 2a, 3a, 4a ... Na can communicate with any other data station through the associated communication units 2c, 3c, 4c, ... Nc over bus 1 in a data transmission network.

Figure 2:
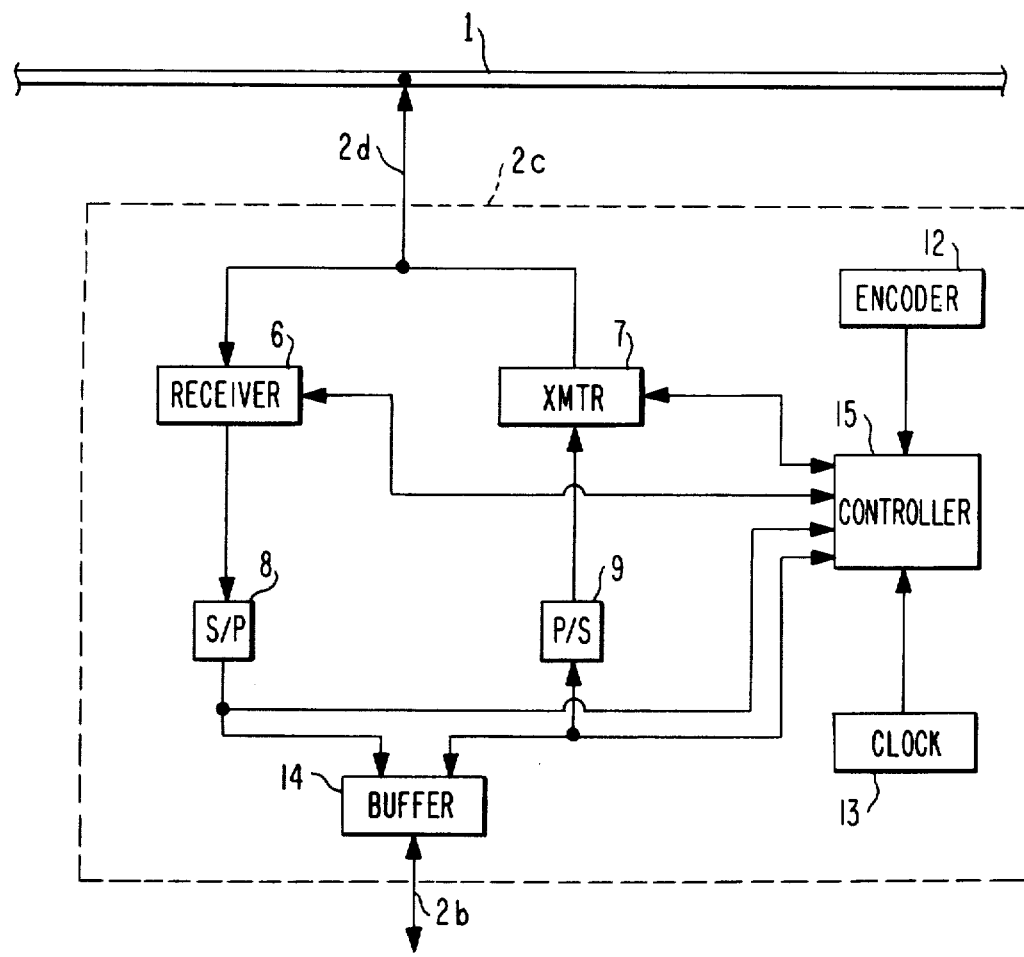
FIG. 2 is a block diagram showing details of a typical one of the communication units utilized in the data transmission network of FIG. 1 in accordance with the present invention.

FIG. 2 depicts the components within any of the communication units 2c, 3c, 4c, ... Nc and is illustratively designated as communication unit 2c. Within the communication unit, line 2b from data station 2a connects to buffer 14, while line 2d from bus 1 is connected to the input of receiver 6 and to the output of transmitter 7. Thus, all data transmitted from the data station to the communication network over bus 1 can be stored in buffer 14 until communication unit 2c has access to bus 1 and all data from the network to data station 2a can be stored in buffer 14 until data station 2a is ready to receive the data. Receiver 6 has its output connected to serial-to-parallel converter 8, the output of which is connected to buffer 14 and to controller 15. Buffer 14 is connected to apply signals from data station 2a to parallel-to-serial converter 9, which also receives signals from controller 15. The output of parallel-to-serial converter 9 is connected to transmitter 7. Receiver 6, transmitter 7 and buffer 14 are connected to controller 15 to permit control of their operation. Controller 15 is further connected to all of the components within the communication unit for overall control purposes.

Encoder 12 applies the binary encoded representation of the address of data station 2a to controller 15. This encoded representation might also include a priority group designation for the data station. Encoder 12 might be any suitable encoding device such as encoding switches or a code connector. Clock 13, which preferably includes a crystal controlled oscillator, applies timing signals to controller 15, as well as to the other time dependent components within the communication unit.

Buffer 14 can be within the data station rather than within communication unit 2c. Alternatively, a system could be implemented with no data buffer. Instead, the data station can request access to the data bus when the data station has data for transmission, or the communication unit can periodically interrogate the data station to determine whether the data station has data for transmission.

Operation of the communication unit will be explained in conjunction with FIG. 3. After any communication unit has applied a data signal 24 to network bus 1, that communication unit applies a synchronization control signal 25 to the bus. Thus, when controller 15 detects the end of the transmission of a data signal from buffer 14 through parallel-to-serial converter 9 and transmitter 7 to the bus, controller 15 then applies the synchronization control signal through converter 9 and transmitter 7 to the bus. Each communication unit 2c, 3c, 4c, ... Nc monitors the bus, and upon receipt of this synchronization control signal those communication units which have data from their data station for transmission on the bus seek access to the bus.

In order to obtain access, each of these communication units generates an encoded representation of the associated data station address and applies the logical one state signals from that encoded representation to data bus 1. Thus, FIG. 3 illustrates the binary encoded representations of three station addresses 2e, 3e, and 4e, which, for example, could be the encoded addresses of data stations 2a, 3a, and 4a of FIG. 1. In the illustrative example of FIG. 3, the most significant bit 40 of each station address 2e, 3e, and 4e is a logical one. Accordingly, each of the associated communication units applies a logical one state signal to data bus 1. In FIG. 3, each of station addresses 2e and 4e has a logical one as its next most significant bit, but station address 3e has a logical zero at that bit 41. Accordingly, during bit interval 41 the communication units generating station addresses 2e and 4e each applies a logical one state signal to data bus 1, while the communication unit generating station address 3e does not apply a signal to the network bus but instead monitors the bus. Upon detection of a logical one state signal on the bus, being generated by both the communication unit for station address 2e and the communication unit for station address 4e, the communication unit of the data station for address 3e determines that a higher priority communication unit is seeking access to the bus, and so that communication unit no longer generates its station address for application to the network, instead dropping out of the access request to wait for the next synchronization control signal 25.

Addresses 2e and 4e both have logical zero as their next bit, and so neither of the associated communication units applies a signal to bus 1 during the next bit interval 42. Instead, they monitor the data bus. Since there is no station address having a logical one state signal being transmitted to the bus during bit interval 42, those communication units do not receive a signal, and so they continue applying their station address to the bus. During the next bit interval 43, station address 2e has a logical one, while station address 4e has a logical zero. Accordingly, the communication unit applying station address 4e monitors the data bus during bit interval 43 and detects the logical one state signal from the station address 2e. That communication unit therefore determines that a higher priority communication unit is seeking access to the network, and so it terminates its request until the next synchronization control signal. This process continues with all of the communication units which have data for transmission until all the communication units but one have dropped out. When that communication unit has applied its complete address, it knows that it has access to the network. Accordingly, it then commences transmission of its data block 32. Upon completion of transmission of that data block, that communication unit transmits a synchronization control signal 25, signalling to all of the communication units of the network that the line is again available. Accordingly, the present invention enables one data station at a time access to the network without interference or collision of data.

Figure 3:
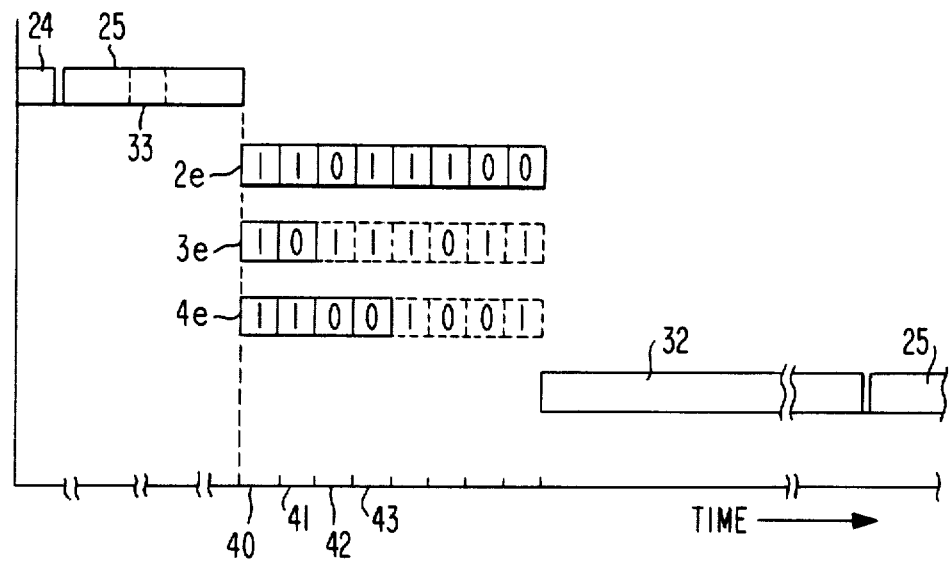
FIG. 3 is a timing diagram useful in explaining operation of a data transmission network in accordance with the present invention.

Although FIG. 3 depicts the synchronization control signal 25 following directly behind the data transmission 24, an acknowledge signal from the receiving communication unit may come between signals 24 and 25.

Figure 4:
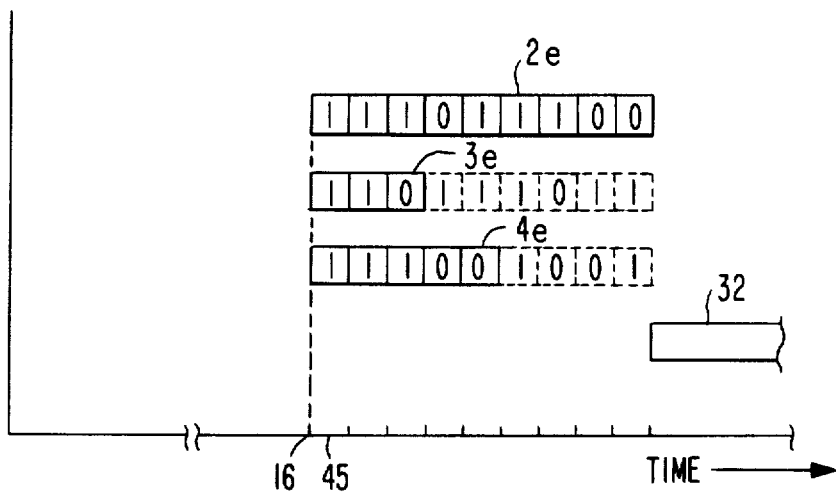
FIG. 4 is a timing diagram useful in explaining startup of operation of a data transmission network in accordance with the present invention.

Each communication unit 2c, 3c, 4c, ... Nc continuously monitors bus 1. If there is no transmission for a preset interval, this indicates to the communication units that the line has not been active. This would occur for example on start-up of the network or after a breakdown. The monitoring is accomplished using a "watch dog" timer which is reset upon detection of any activity on the bus. When the watch dog timer within a communication unit times out, that communication unit first applies a logical one state signal to the bus to reset the watch dog timers in all the communication units which have not yet timed out. All timed-out communication units then apply their addresses to the bus to seek control of the bus, using the same procedure as in the continuing operation situation depicted in FIG. 3. FIG. 4 depicts the situation in which three watch dog timers have timed out substantially simultaneously. Although it is unlikely that three, or even two, timers would time out at the same time, FIG. 4 depicts that situation for purposes of explanation. As illustrated in FIG. 4, the watch dog timers within the communication units associated with the data stations having addresses 2e, 3e, and 4e have all timed out at time point 16. Accordingly, each of the three communication units then applies a logical one state signal to bus 1 during bit interval 45. That signal resets the watch dog timer of each communication unit which has not yet timed out, and those reset communication units await the next synchronization control signal before attempting to obtain access to the bus.

After bit interval 45, each of the communication units applies the encoded representation of its data station address, just as in the operation described in conjunction with FIG. 3, and the highest priority communication unit obtains access to the data bus. That communication unit then applies either its data block 32 or, if it has no data block, a synchronization control signal 25.

Figure 5:
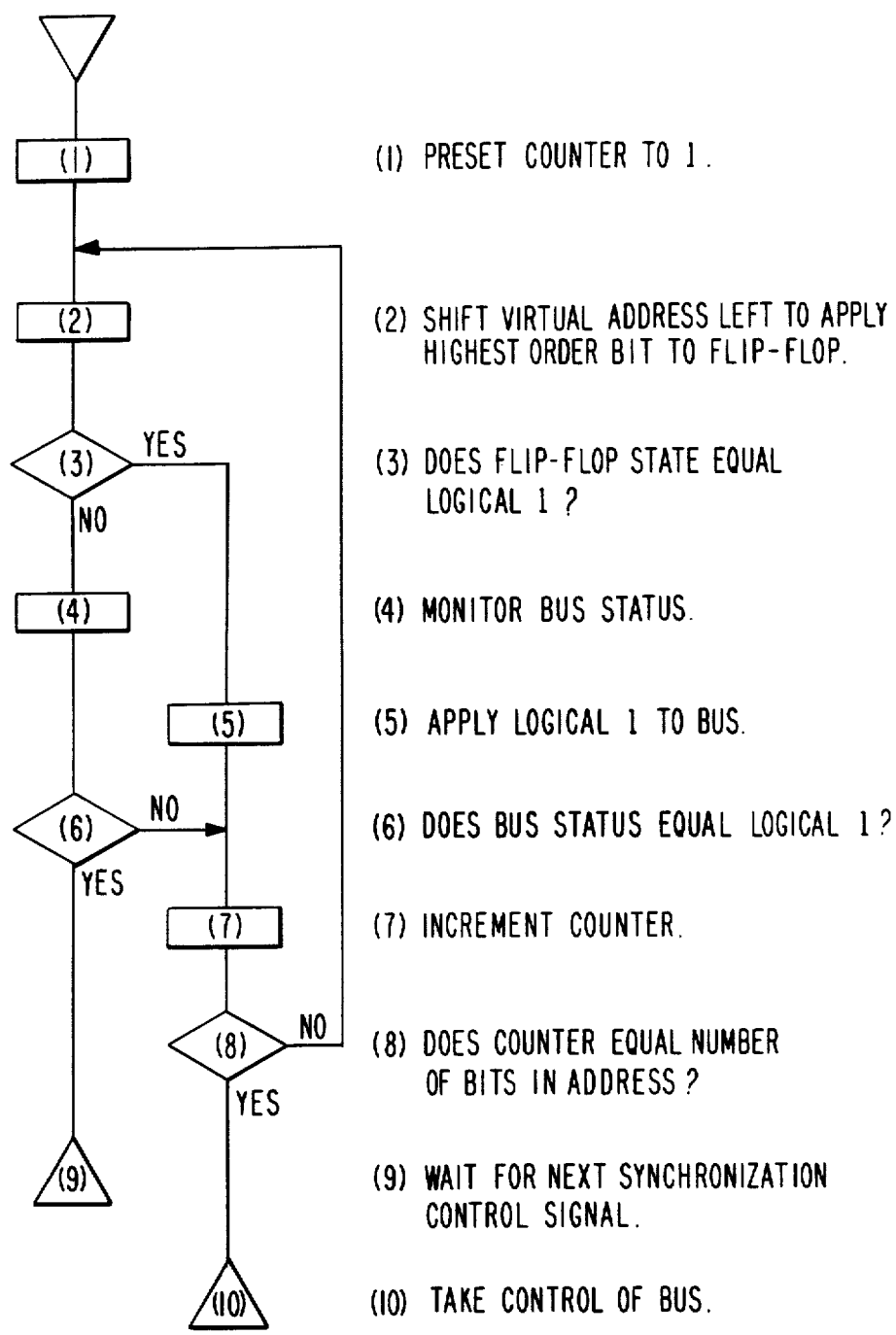
FIG. 5 is a flow chart useful in understanding operation of a communication unit in a data transmission network in accordance with the present invention.

FIG. 5 is a flow chart of the operation of controller 15 in determining the communication unit 2c, 3c, 4c ... Nc to be given access to bus 1 in accordance with the procedure described above with reference to FIGS. 3 and 4.

Figure 6:
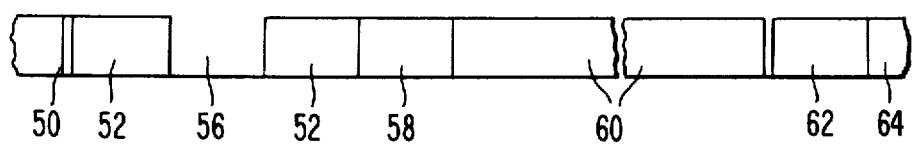
FIG. 6 is a fragmentary timing diagram illustrating operation of a data transmission network in accordance with the present invention.

FIG. 6 is a timing diagram illustrating operation of the data transmission network. A data transmission, or signal acknowledging receipt of a transmission, ends at time point 50. The communication unit from which the data transmission was applied to the bus then applies a synchronization control signal 52. There then follows an interval 56 during which each communication unit having data for transmission on the bus can apply its associated station address to the bus, as set forth above. If no communication unit has data, there is no transmission during this interval, as illustrated in interval 56 of FIG. 6. In such event, the last communication unit to transmit repeats its synchronization control signal 52. During the immediately following interval 58 if there is one or more communication units having data for transmission over the bus, those stations apply their station addresses. The communication unit which then obtains access to the bus transmits its data during the subsquent time interval 60. That transmission includes the address of the station for which the transmission is intended, and if the transmission is properly received the indicated station might follow the transmission with an acknowledging signal 62. The station which transmitted data during time interval 60 then applies a synchronization control signal 64 to the bus.

If the data station address itself is used to determine the priority of the communication units in obtaining access to data bus 1, then the communication unit from the station having the highest station address will have preferential priority. This may result in communication units of stations with lower addresses having difficulty in obtaining access to the data bus. To overcome this, an algorithm can be performed on the station address to provide a virtual address for use in determining the priority of the communication units in obtaining access to the data network. For this purpose, synchronization control signal 25, depicted in FIG. 3, can include the address 33 of the last station to transmit, from which that synchronization control signal was generated. Each communication unit receiving that synchronization control signal then uses its own station address and the received station address 33 in an algorithm to provide this virtual address.

By way of example, the algorithm can call upon each communication unit to subtract its station address from the station address 33 within the synchronization control signal 25. As an illustration of this, assume that the station address 33 is binary encoded 11000011 (decimal 195) and that the three stations having the station addresses 2e, 3e, and 4e of FIG. 3 seek access to the network. Subtracting station address 2e (binary 11011100, decimal 220) from the station address 33 gives a virtual address 11100111 (decimal 231) for the data station having actual station address 2e. Subtracting station address 3e (binary 10111011, decimal 187) from station address 33 gives a virtual address 00001000 (decimal 8) for the data station having actual station address 3e. Subtracting station address 4e (binary 11001001, decimal 201) from station address 33 gives a virtual address 11111010 (decimal 250) for the data station having actual station address 4e. Thus the data station having address 4e has the highest virtual address and so is the next station to gain access to data bus 1. Note that of station addresses 2e, 3e, and 4e, station address 4e (decimal 201) is the closest following station address to station address 33 (decimal 195) of the data station which just transmitted. Thus, each data station is assigned priority in turn.

While subtraction of the actual address of the station desiring access to the bus from the address of the station which just had access has been described, other algorithms might be utilized to determine priority. Thus, for example, an algorithm could be utilized which results in those data stations having a high volume of data for transmission being assigned several virtual addresses so that those stations receive access to bus 1 more frequently, and thus more rapidly, than stations having lower volumes. Such an algorithm might permit determination of the data station to be given access after comparison of less than all eight bits of the station's virtual address.

Although the present invention has been described with reference to preferred embodiments, numerous modifications and rearrangements could be made, and still the result would come within the scope of the invention.

What is claimed is:

1. In a system for transmission of message blocks from one of a plurality of data stations, each data station having a unique address, through one of a like plurality of communication units, each communication unit uniquely associated with one of the data stations, over a data bus, through another of the plurality of communication units, to another of the plurality of data stations, the improvement in which each communication unit comprises:

first means communicating with the associated data station for permitting transmission of message blocks between said communication unit and the data station;

second means coupling the communication unit to the data bus for permitting transmission of message blocks, synchronization signals, and control signals between the communication unit and the data bus;

third means, responsive to receipt by said second means of a synchronization signal at the time a message block is available at said first means for transmission by the communication unit by way of said second means to the data bus, for transmitting the logical ones of an unique encoded representation of the address of the associated data station to said second means for transmission to the data bus, said logical ones being transmitted to the data bus in sequence during respective bit intervals associated with such logical ones;

fourth means for monitoring the data bus for logical ones generated by any other of said plurality of communication units during respective bit intervals associated with the logical zeros of the unique encoded representation;

fifth means, responsive to monitoring of a logical one signal on the data bus by said fourth means, for terminating transmission of the logical ones of the encoded representation until receipt of the next synchronization signal by said second means; and sixth means, responsive to the transmission of all of the logical ones of the complete encoded representation to the data bus without the monitoring of a logical one signal by said fourth means and the accompanying termination of transmission of the encoded representation by said fifth means in response to the monitoring of a logical one by said fourth means, for initiating transmission from the communication unit to the data bus of a signal including the message block, a portion of said signal constituting a synchronization signal.

2. The improvement of claim 1 in which said third means includes means for performing an algorithm on the address of the associated data station to generate the encoded representation.

3. The improvement of claim 2 in which the synchronization signal includes the address of the data station associated with the communication unit transmitting the synchronization signal and in which the algorithm includes subtracting (a) the address of the data station associated with the communication unit performing the algorithm from (b) the address of the data station associated with the communication unit transmitting the synchronization signal.

4. The improvement of claim 1 further comprising seventh means, responsive to absence of any transmission on the data bus for a preset time interval, for transmitting a logical one signal and then the logical ones of the encoded representation to the data bus in sequence during respective bit intervals associated with such logical ones.

5. The improvement of claim 4 in which said third means includes means for performing an algorithm on the address of the associated data station to generate the encoded representation.

6. The improvement of claim 5 in which the synchronization signal includes the address of the data station associated with the communication unit transmitting the synchronization signal and in which the algorithm includes subtracting the address of the data station associated with the communication unit performing the algorithm from the address of the data station associated with the communication unit transmitting the synchronization signal.

7. In a system for transmission of message blocks from one of a plurality of data stations, each data station having a unique address, through one of a like plurality of communication units, each communication unit uniquely associated with one of the data stations, over a data bus, through another of the plurality of communication units, the another of the plurality of data stations, the improvement in which each communication unit comprises:

first means communicating with the associated data station for permitting transmission of message blocks between said communication unit and the data station;

second means coupling the communication unit to the data bus for permitting transmission of message blocks and control signals between the communication unit and the data bus;

third means coupled to said second means and responsive to absence of any transmission on the data bus for a preset time interval, for transmitting a logical one signal and then the logical ones of a unique encoded representation of the address of the associated data station to said second means for transmission to the data bus, said logical ones being transmitted to the data bus in sequence during respective bit intervals associated with such logical ones;

fourth means for monitoring the data bus for logical ones generated by any other of said plurality of communication units during respective bit intervals associated with the logic zeros of the unique encoded representation;

fifth means, responsive to monitoring of a logical one signal on the data bus by said fourth means, for terminating transmission of the encoded representation until receipt of a synchronization control signal by said second means; and sixth means, responsive to the transmission of all of the logical ones of the complete encoded representation to the data bus without the monitoring of a logical one signal on the data bus by said fourth means and the accompanying termination of transmission of the encoded representation by said fifth means in response to the monitoring of a logical one by said fourth means, for initiating transmission from the communication unit to the data bus of a signal including any message block then to be transmitted to the data bus by the communication unit, a portion of said signal constituting a synchronization control signal.

8. The improvement of claim 7 in which said third means includes means for performing an algorithm on the address of the associated data station to generate the encoded representation.

9. The improvement of claim 8 in which said sixth means initiates transmission of a signal a portion of which constitutes a synchronization signal including the address of the data station associated with the communication unit transmitting the synchronization signal and in which the algorithm includes subtracting the address of the data station associated with the communication unit performing the algorithm from the address of the data station associated with the communication unit transmitting the synchronization signal.

* * * * *